US007617525B1

(12) United States Patent
Moeck et al.

(10) Patent No.: US 7,617,525 B1
(45) Date of Patent: Nov. 10, 2009

(54) SYSTEM AND METHOD FOR CONNECTIONLESS CLIENT-SERVER COMMUNICATIONS

(75) Inventors: Andrew Moeck, Huntington Beach, CA (US); Wendell Brown, Las Vegas, NV (US)

(73) Assignee: Alto Ventures, Inc., Las Vegas, NV (US)

( * ) Notice: Subject to any disclaimer, the term of this patent is extended or adjusted under 35 U.S.C. 154(b) by 936 days.

(21) Appl. No.: 11/157,421

(22) Filed: Jun. 21, 2005

(51) Int. Cl.
*G06F 9/00* (2006.01)
*G06F 17/00* (2006.01)
*G06F 15/16* (2006.01)

(52) U.S. Cl. .................. 726/11; 709/227; 709/228; 709/229

(58) Field of Classification Search .............. 726/11
See application file for complete search history.

(56) References Cited

U.S. PATENT DOCUMENTS

| 5,548,589 | A * | 8/1996 | Jeon et al. ................ 370/399 |
| 6,397,253 | B1 * | 5/2002 | Quinlan et al. ........... 709/227 |
| 6,674,758 | B2 * | 1/2004 | Watson .................... 370/401 |
| 6,717,949 | B1 * | 4/2004 | Boden et al. ............. 370/401 |
| 6,925,487 | B2 * | 8/2005 | Kim ........................ 709/203 |
| 7,020,687 | B2 * | 3/2006 | Mooney et al. .......... 709/206 |
| 7,080,151 | B1 * | 7/2006 | Borella et al. ........... 709/230 |
| 7,089,281 | B1 * | 8/2006 | Kazemi et al. .......... 709/203 |
| 7,274,684 | B2 * | 9/2007 | Young et al. ............. 370/352 |
| 2002/0138622 | A1 * | 9/2002 | Dorenbosch et al. ...... 709/227 |
| 2003/0009561 | A1 * | 1/2003 | Sollee .................... 709/227 |
| 2004/0083386 | A1 * | 4/2004 | Marquet et al. ......... 713/201 |
| 2006/0179147 | A1 * | 8/2006 | Tran et al. .............. 709/227 |

OTHER PUBLICATIONS

Goode, "Voice Over Internet Protocol (VoIP)", Sep. 2002, IEEE, pp. 1495-1517.*

* cited by examiner

*Primary Examiner*—Kambiz Zand
*Assistant Examiner*—William S Powers
(74) *Attorney, Agent, or Firm*—Park, Vaughan & Fleming LLP

(57) ABSTRACT

A system and method for conducting a client-server application (e.g., instant messaging, VOIP telephony) using non-persistent communications. Clients issue periodic heartbeat messages to a connectionless server using a non-persistent (e.g., UDP) communication protocol. The heartbeat messages identify the clients by unique client identifiers. When an application server has an unsolicited communication for a client (e.g., a new instant message, a new VOIP call), the application server retrieves the client's address from the connectionless server if it does not already have the address. The application server forwards the unsolicited communication to the client via a non-persistent communication, and may spoof the connectionless server if necessary to reach the client through a firewall, proxy, NAT or similar entity. Clients that cannot use non-persistent protocols establish persistent connections with a client manager. The client manager issues heartbeat messages to the connectionless server and receives and forwards unsolicited communications for these clients.

20 Claims, 3 Drawing Sheets

SYSTEM AND METHOD FOR CONNECTIONLESS CLIENT-SERVER COMMUNICATIONS

BACKGROUND

This invention relates to the field of computer systems. More particularly, a system and methods are provided for facilitating client-server communications without using persistent (e.g., TCP or Transmission Control Protocol) communication connections.

Existing client-server communication architectures usually require persistent TCP communication connections to ensure the server can always communicate with the client, and vice versa. When a persistent communication connection is established between two computing devices, each device dedicates certain resources to the connection, such as a communication socket, a TCP communication port, memory, etc.

A persistent connection remains open as long as both devices keep the necessary resources dedicated to the connection. Because the connection remains open indefinitely, either device can send a communication to the other device at any time, without having to take action normally associated with opening a communication session (e.g., handshaking, authentication).

Even if a client is situated behind a firewall, proxy or Network Address Translator (NAT) device designed to protect the client from unsolicited communications, a server having a persistent connection with the client will be able to send communications at any time. If a persistent connection was not established, communications from the server to the client might be blocked.

However, because resources must be dedicated to each persistent connection maintained by a device, there is a finite limit on the number of client connections a server may host. Therefore, depending on the application and the amount and type of resources that must be dedicated, a plethora of servers may be required to accommodate all clients desiring simultaneous application sessions. This may entail substantial expense, in both the acquisition and maintenance of many servers.

For example, a traditional instant messaging system or application may have millions of users desiring simultaneous use of the system. A server hosting the application may only be able to serve on the order of twenty-five thousand simultaneous connections.

Thus, there is a need for a more scaleable system and method for supporting client-server communications In addition, because each client in a client-server architecture typically establishes a persistent connection with just one server, only that server can send communications (e.g., instant messages from other clients) to the client. All communications to or from the client must transit that one server, thereby increasing its workload.

There is thus also a need for a client-server communication architecture that does not limit a client's communication access to a single server.

SUMMARY

In one embodiment of the invention, a system and method are provided for conducting a client-server application (e.g., instant messaging, VOIP telephony) using non-persistent communications.

In this embodiment, clients issue periodic heartbeat messages to a connectionless server via non-persistent (e.g., UDP) communication connections, which may or may not be acknowledged. The heartbeat messages identify the clients (e.g., by unique client identifiers) and may provide other client information such as network address (e.g., IP address, UDP port number), status (e.g., busy, available, out of the office), etc.

In this embodiment, if a client is protected by a firewall (or proxy, NAT or similar entity), the heartbeat messages open paths through the firewall allowing the connectionless server (or other entity using the connectionless server's address) to communicate with the client.

When an application server has an unsolicited communication for a client (e.g., a new instant message, a new VOIP call), the application server retrieves the client's address from the connectionless server if it does not already have the address. The application server then forwards the unsolicited communication to the client via a non-persistent communication, and may spoof the connectionless server if necessary (e.g., if the client is protected by a firewall).

In an embodiment of the invention, persistent-only clients (i.e., clients that cannot use a non-persistent protocol) establish persistent connections with a client manager. The client manager issues heartbeat messages to the connectionless server on behalf of the clients. These heartbeat messages may identify the corresponding persistent-only clients (e.g., by their unique client identifiers), but provide an address of the client manager as the destination for messages addressed to these clients. The client manager thus receives and forwards unsolicited communications directed to persistent-only clients.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for a highly scaleable client-server communication architecture, allowing a single server to exchange communications with a greater number of clients than previously known architectures, without using persistent communication connections. Illustrative systems and methods described herein may be implemented in environments in which a client is protected by a firewall, proxy, NAT (Network Address Translator) or other device capable of blocking unsolicited communications.

This embodiment of the invention may be implemented for various types of applications requiring the exchange of communications, between a client and a server, particularly unsolicited communications. Example types of applications include instant messaging, VOIP (Voice over Internet Protocol) telephony, media streaming, etc. Therefore, an unsolicited communication may be a first instant message to the client from another client, a new VOIP call to the client, a request for media streaming or file sharing, etc.

In embodiments of the invention described herein, a persistent communication or a persistent communication connection refers to communications conducted using a protocol (e.g., TCP or Transmission Control Protocol) that establishes a persistent or durable connection. Multiple messages, packets or other communications may be exchanged over a persistent connection once it is established, and the connection may be maintained indefinitely.

In contrast, a non-persistent communication or non-persistent communication connection refers to communications conducted using a protocol (e.g., UDP or User Datagram Protocol) that does not employ persistent or durable connections. Each separate datagram, message or other communication may entail the creation of a separate non-persistent connection. Non-persistent connections may not entail true "connections," because a non-persistent communication connection may be terminated before any acknowledgement of the communication is received from the recipient, and possibly even before the recipient receives the communication.

Figure 1:
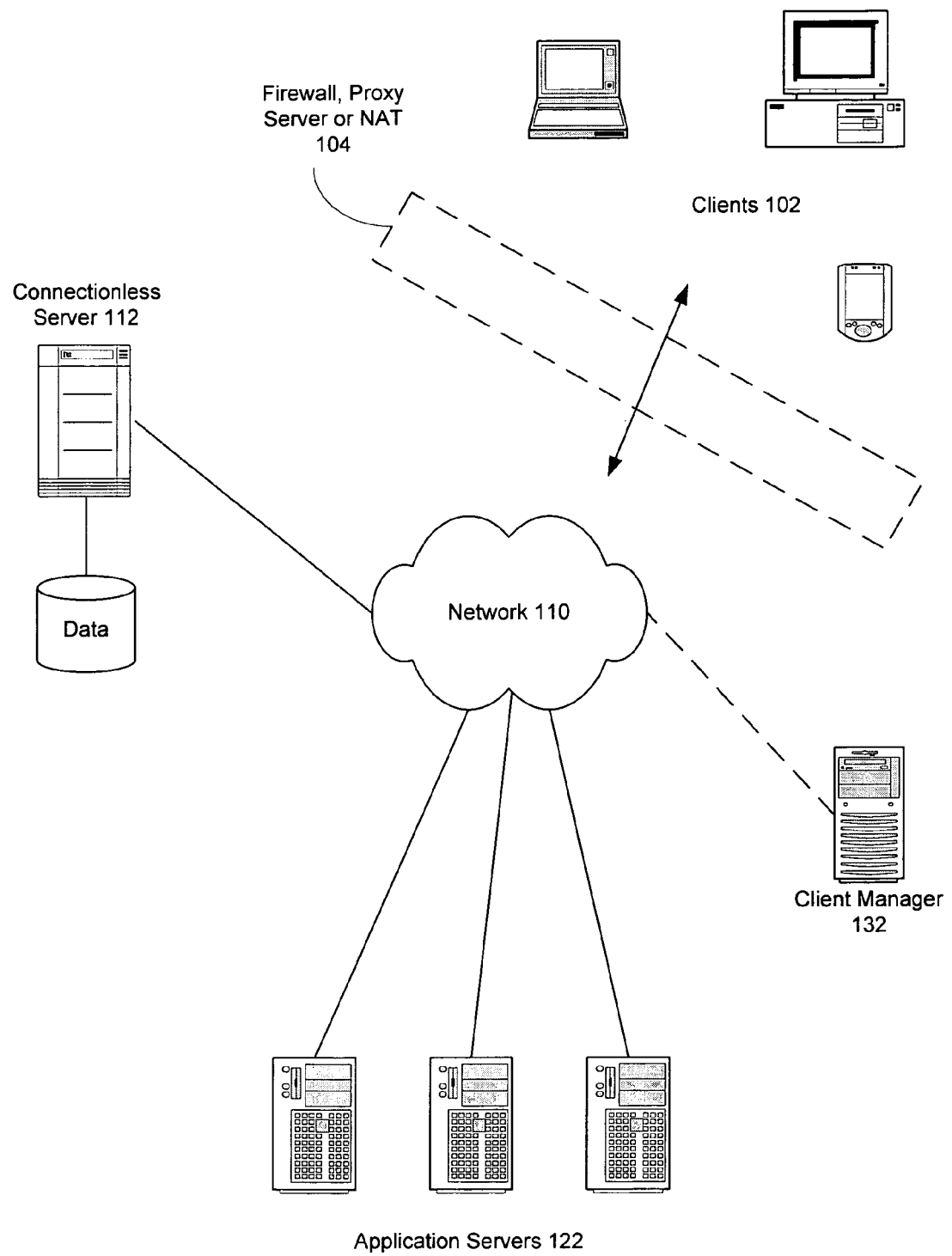
FIG. 1 is a block diagram depicting a computing environment in which an embodiment of the present invention may be implemented.

FIG. 1 is a block diagram of a computing environment in which an embodiment of the invention may be implemented. Other embodiments may be readily derived from the following discussion to suit other environments.

The environment of FIG. 1 includes any number of clients 102 executing an application served, managed or supported by any number of application servers 122. Application servers 122 may function as web servers, data servers or other types of servers.

Clients 102 and application servers 122 are coupled via any type of communication links, which may be dedicated or shared, wired or wireless, etc. In the illustrated embodiment of the invention, clients and application servers are coupled via network 110, which may comprise the Internet.

Clients 102 may be protected or separated from network 110 by a firewall, proxy, Network Address Translator (NAT) or other software or hardware performing a similar function (collectively referred to herein as firewalls). For example, firewall 104 may be configured to prevent an external computing device from contacting a client 102 with an unsolicited electronic communication.

In traditional client-server architectures, a client may be required to maintain a persistent communication connection (e.g., a TCP connection) with an application server in order to allow each to communicate with the other at any time, and to allow the server to send unsolicited messages to the client through the firewall. In embodiments of the invention described herein, however, client-server communications may be conducted through a firewall without requiring persistent connections.

Connectionless server 112 is coupled to clients 102 and application servers 122, via network 110 and/or other communication links. Optional client manager 132 is also coupled to clients 102 and application servers 122. In embodiments of the invention described herein, any number of connectionless servers (e.g., one or more), application servers (e.g., one or more) and client managers (e.g., zero or more) may be employed, to serve any number of clients.

Clients 102 operate any appropriate suite of protocols for communicating with connectionless server 112, application servers 122, client manager 132, other clients and/or other entities. Thus, a client may execute IP (Internet Protocol), TCP, UDP, IPX (Internetwork Packet Exchange), SPX (Sequenced Packet Exchange), RTP (Real-time Transport Protocol), RTCP (Real-Time Control Protocol) and so on, along with any application that employs some form of client-server communications (e.g., instant messaging, VOIP, media streaming).

In the illustrated embodiment of the invention, a client 102 maintains intermittent or periodic (i.e., non-persistent) connections with connectionless server 112. More specifically, the client periodically issues a heartbeat message to the connectionless server via non-persistent (e.g., UDP) communication connections, to inform the connectionless server that the client is engaged in an application session.

A heartbeat message, which may comprise a single packet, may include a unique identifier associated with the client, and may identify the client's network (e.g., IP) address, port number (e.g., UDP port number), and/or other information useful or necessary in sending communications to, or exchanging communications with, the client. The client's address information may be expressly identified in a payload of the packet or may be gleaned from a packet header. For example, if the heartbeat message transits a NAT, the client's actual address may be replaced with a different address.

Connectionless server 112 comprises or is coupled to a database or other collection of data for storing information about clients 102 sending heartbeat communications to the connectionless server. For each such client, the connectionless server stores session information such as the client's unique identifier, address, port number, etc. The unique identifier may be assigned by connectionless server 112, an application server 122 or some other entity, and may be associated with a particular application supported by the application servers.

Each time connectionless server 112 receives a heartbeat message from a client, it updates its data or at least compares content of the message to information stored for the client (to determine if anything has changed), and updates its data to reflect any changes.

By sending periodic heartbeat messages via non-persistent communication connections, a client ensures that the connectionless server knows the client is operating, informs the connectionless server of the client's communication address and, if firewall 104 is present, opens a (possibly temporary) communication path through the firewall.

For some period of time after sending a heartbeat message via a non-persistent communication connection, a device having the destination address (i.e., the address of the connectionless server) of the heartbeat message can send communications to the client without the communications being blocked or intercepted. If firewall 104 is not present, the period of time may be indefinite.

Similarly, after a client sends a communication (e.g., an instant message, a request for streaming media) to an application server via a non-persistent communication connection, for some period of time that application server can respond normally. If present, firewall 104 will recognize the application server's address and therefore not block or intercept the application server's transmission.

However, an application server 122 may need to send a communication to a client, but may not know the client's communication address because it does not have a persistent connection with the client. Or, it may need to send an unsolicited communication to the client and there may not be an open non-persistent communication path from the application server to the client through firewall 104.

If the application server does not already possess the necessary client information (e.g., unique client identifier, IP address, UDP port number) to get the message to the client, or if a non-persistent communication path through firewall 104 is not available, the application server retrieves or obtains the information from connectionless server 112. Illustratively, an application server 122 queries the connectionless server, using the client's unique identifier, to retrieve the communication address information stored by the connectionless server.

The application server then sends the unsolicited communication to the client, but formats the communication (e.g., source IP address, source UDP port number) to make it appear to have originated from the connectionless server. By spoofing connectionless server 112, the communication will be accepted by firewall 104 through the communication path opened for the periodic heartbeat messages.

In the environment of FIG. 1, any application server 122 can send unsolicited communications to any client 102, because they can retrieve the clients' addresses from connectionless server 112, and because clients are not tied to specific application servers via persistent communication connections.

In one alternative embodiment of the invention, one or more clients may not be able to operate UDP, RTP or another suitable non-persistent communication protocol. For example, the UDP port(s) on firewall 104 may have been closed. Clients that cannot engage in non-persistent communications may be termed "persistent-only clients."

In this alternative embodiment of the invention, these clients establish TCP (or other persistent) connections with client manager 132. In turn, the client manager interacts with connectionless server 112 on the clients' behalf.

In one implementation of this alternative embodiment, client manager 132 registers a persistent-only client with connectionless server 112 using the persistent-only client's unique identifier, but with an address (e.g., IP address, TCP or UDP port number) of the client manager. When an application server has an unsolicited communication for the persistent-only client, it queries connectionless server 112 as it would for a normal client. The application server receives the client manager's address and sends the communication to the client manager, which converts it as necessary (e.g., into TCP format) and forwards it to the persistent-only client. Client manager 132 may maintain persistent and/or non-persistent connections with an application server 122.

One benefit provided by this alternative embodiment of the invention is that communications processing is offloaded from the application servers even for persistent-only clients. The application servers can therefore be dedicated to the execution of application logic without having to dedicate resources to maintaining persistent communication connections with clients. Instead, client manager 132 performs the necessary communications handling, acting as a pivot to relay messages between the persistent-only clients and the application servers.

Server computers depicted in FIG. 1 may or may not maintain persistent connections with other servers. For example, connectionless server 112 may maintain employ TCP and/or UDP communications with application servers 122 and client manager 132.

Figure 2:
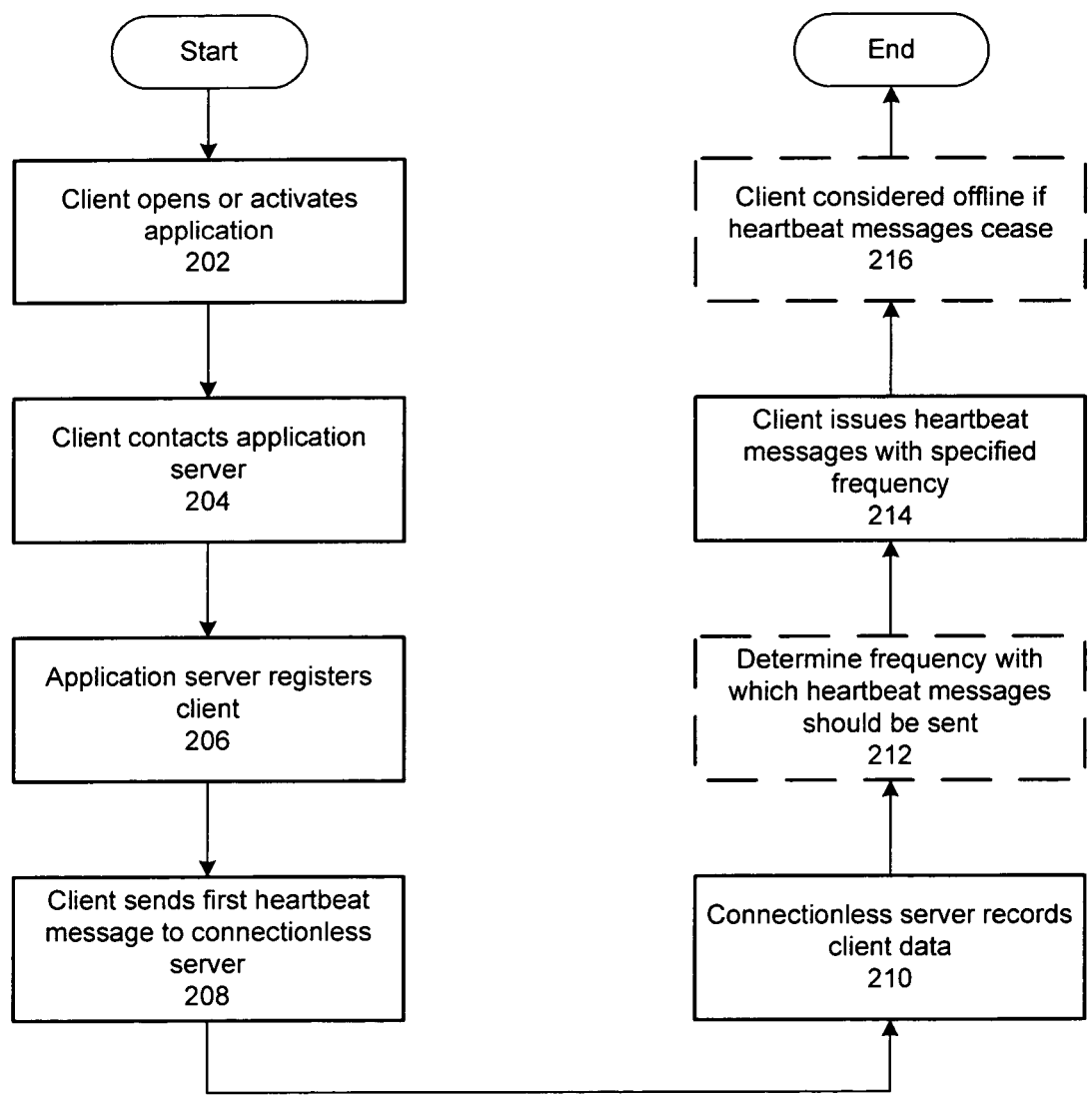
FIG. 2 is a flowchart illustrating one method by which a client notifies a connectionless server of the client's operating status, without using a persistent communication connection, in accordance with an embodiment of the invention.

FIG. 2 demonstrates a method of registering a client with a connectionless server, and periodically sending heartbeat messages from the client via non-persistent communication sessions, according to one embodiment of the invention.

In operation 202, a user operating a client computing device opens or activates an application that requires communications to be passed between the client and one or more application servers. Illustrative applications include instant messaging, VOIP telephony, media streaming and file sharing.

In operation 204, the client registers with (or logs into) an application server via a non-persistent (e.g., UDP) or persistent (e.g., TCP) communication connection. In this embodiment of the invention, the client registers each time it initiates an application session. Registration may involve identifying the application and providing client or user information such as an email address or other identifier (e.g., username, handle), product license key, IP address, UDP port number, type of client computing device, operating system, communication protocols supported by the client, etc.

To locate an application server, the client may be configured to query a central server (e.g., an availability server) to determine how to contact an application server and/or a connectionless server. Illustratively, the central server may provide an address of an application server or connectionless server, or an address of a load balancer for either or both types of servers.

In operation 206, the application server registers the client (e.g., in a central application database) and issues the client a unique identifier that is valid for the duration of the client's session. Registration makes the client available to other clients or the application in general (e.g., to receive instant messages or VOIP calls).

In one alternative embodiment of the invention, a client receives a unique identifier the first time it registers with an application server. That identifier may then be valid for some predetermined period of time, until a client hardware or software configuration changes (e.g., until the client installs a different version of the application), or until some other condition arises.

In the illustrated embodiment of the invention, a persistent-only client establishes a persistent (e.g., TCP) communication connection with an application server in order to register and initiate an application session. The persistent-only client is otherwise registered in the same or a similar manner as a regular client. As one alternative, a persistent-only client may register with or through a client manager.

After the application server acknowledges the client's registration, if a persistent (e.g., TCP) communication connection was established for the registration, that connection is terminated.

In operation 208, the client sends to a connectionless server a first heartbeat message, via a non-persistent (e.g., UDP) communication connection, to inform the connectionless server that the client now has an active application session. The client may obtain the connectionless server's address from the application server or from a central (e.g., availability) server.

The heartbeat message may include (in a header and/or payload) any information useful for identifying the client (e.g., unique identifier, IP address, UDP port number) and/or indicating the client's status.

If the client is situated behind a firewall, proxy, NAT or other hardware and/or software entity configured to screen unsolicited access to the client, transmission of the first heartbeat message opens a path through the firewall. As a result, return communications from the connectionless server (or some other entity using the connectionless server's address) will be allowed through the firewall for some period of time.

In the illustrated embodiment of the invention, a persistent-only client establishes a persistent (e.g., TCP) communication connection with a client manager after or while registering to initiate an application session. The client manager then sends to a connectionless server a first heartbeat message for the client. The message is configured with the persistent-only client's identifying information (e.g., unique identifier), but with the connectionless server's communication address.

In operation 210, in response to the first heartbeat message the connectionless server creates or replaces a data entry for the client, to record its unique identifier, network address and/or other information (e.g., time of receipt of the heartbeat message, whether the client supports UDP, client status). Illustratively, when the client's session ends, the connectionless server may purge the data entry.

In another embodiment of the invention, however, unique client identifiers may have greater duration. In this embodiment a connectionless server may or may not purge a client data entry after that client terminates an application session.

In optional operation 212, the client and/or the connectionless server determine a frequency with which the client should issue heartbeat messages to the connectionless server. In one implementation of the illustrated embodiment of the invention, a default period between 5 and 60 seconds may be adopted.

In one alternative implementation, the model or type of firewall protecting the client is identified. As one skilled in the art will recognize, a firewall or similar device often has a time-out parameter associated with communication paths that are opened through the firewall when a client transmits a communication through the firewall. After that time-out parameter expires, if no return communication or other outgoing communication is received on the same path, the path is closed.

Therefore, in this alternative implementation the default or current time-out parameter of the firewall is identified, and the client's heartbeat period is configured to prevent paths through the firewall from timing out. Data regarding different firewalls and their time-out parameters may be stored on the connectionless server, on clients, on application servers and/or elsewhere.

In other embodiments of the invention, optional operation 212 may be performed during the client's registration, after some number of heartbeat messages have been sent, or at some other time. For example, the heartbeat period may steadily increase (or decrease) in duration over time until an optimal period is determined.

In operation 214, the client begins sending heartbeat messages to the connectionless server, with at least the determined frequency. In particular, until the client closes, deactivates or terminates the application, a heartbeat message is issued whenever the selected heartbeat period of time expires since the last heartbeat message was issued.

Each time the connectionless server receives another heartbeat message from a client, it may compare the contents of the message with the data it has stored for that client or automatically overwrite the previous data. The stored data are thus updated to reflect any change in the client's network address and/or status, and possibly to reflect the date/time of the most recent heartbeat message or other information.

In one embodiment of the invention, a client's heartbeat period may be dynamically altered. For example, if it is determined that communication paths opened through a client firewall are timing out, the period may be decreased. Alternatively, the period may be increased if, for example, it is learned that there is no firewall screening unsolicited communications.

In optional operation 216, if the connectionless server does not receive a heartbeat message for some period of time from the client longer than the expected period for heartbeat messages, the client may be assumed to be offline or inoperative. The period of time after which this assumption may be made, in one implementation, may be approximately 4 or 5 times the expected period between heartbeat messages.

After the client is assumed to be offline, if an application server requests the client's contact information (e.g., IP address, UDP port), the application server may be informed that the client may be offline. However, the connectionless server may still provide the requested information.

In one alternative embodiment of the invention, once a client is registered once with the application (e.g., via an application server), each time the client initiates an application session, its first contact may be with a connectionless server (e.g., as a first heartbeat message). The connectionless server may then handle tasks such as logging the client into the application, obtaining, assigning or validating the client's unique identifier, etc.

In the embodiment of the invention illustrated in FIG. 2, clients send heartbeat messages even while actively exchanging communications with an application server (or client manager). The connectionless server thus knows that the client is still operating.

In one alternative embodiment of the invention, however, the client only sends heartbeat messages during idle time, when it is not actively communicating with an application server or client manager. In particular, a heartbeat message is issued whenever the specified period of time expires after the most recent outgoing communication from the client or the most recent incoming communication to the client address, whichever is more recent.

In this alternative embodiment of the invention, when the client is actively communicating with an application server or client manager, that entity may notify the connectionless server that the client is alive, or take other action to ensure the client is not assumed to be inoperative.

In an embodiment of the invention in which there is no firewall protecting the client, heartbeat messages may be sent with less frequency (e.g., every ten minutes, every hour).

As described above, a persistent-only client may not send heartbeat messages in this embodiment of the invention. Instead, the persistent-only client maintains a persistent connection with a client manager, and the client manager issues heartbeat messages to the connectionless server on behalf of the persistent-only client.

The heartbeat period for a persistent-only client may be fairly long. In one implementation, heartbeat messages need not be sent at all for persistent-only clients if the client manager is configured to inform the connectionless server whenever the persistent-only client comes online or goes offline and/or whenever the client's actual address changes.

When a client sends a communication to an application server (e.g., to send an instant message, to stream media), that server receives the client's address information and can therefore send communications back to the client via non-persistent (e.g., UDP) communication connections without querying the connectionless server. The application server need not spoof the connectionless server in this instance.

However, if the client is behind a firewall, after a path through the firewall that was opened for the client and application server closes, the application server may need to spoof the connectionless server in order to send an unsolicited communication to the client. In this case the application server may query the connectionless server to determine the client's (and/or connectionless server's) communication address.

In another alternative embodiment of the invention, a UDP proxy or similar entity may be employed to receive some or all non-persistent communications from clients capable of using a non-persistent communication protocol. The proxy may thus receive client registrations and/or heartbeat messages and route them to appropriate destinations.

Figure 3:
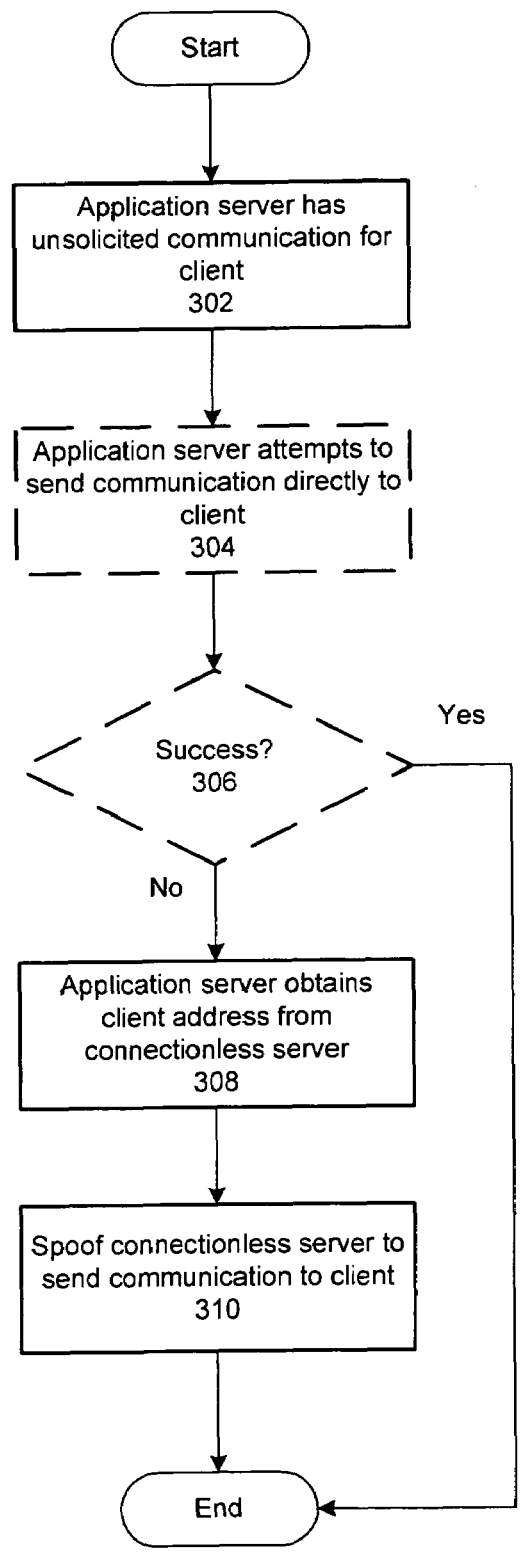
FIG. 3 is a flowchart illustrating one method by which a server may issue an unsolicited communication to a client without a persistent communication connection, in accordance with an embodiment of the invention.

FIG. 3 demonstrates a method for sending an unsolicited communication from an application server to a client using a non-persistent communication connection, according to one embodiment of the invention. The client may or may not be protected by a firewall (e.g., a firewall, a proxy, a NAT).

In operation 302, the application server generates or receives an unsolicited communication for the client. The communication is considered unsolicited because it is not a response to a communication from the client, or it is received at the application server some period of time after a communication from the client.

For example, using non-persistent (e.g., UDP) communication sessions as described above, clients may exchange communications with application servers. If the client is not protected by a firewall, the server can issue communications directly to the client (i.e., without spoofing a connectionless server), as long as the client keeps operating and its communication address does not change.

If the client is protected by a firewall, as long as the client communicates with the application server with sufficient frequency, a path opened through the firewall to allow them to communicate will not time-out and close. But, if too much time passes after a client communication is sent to the application server through a firewall, a communication from the application server that may be considered responsive to the client communication (e.g., an instant message responding to an instant message from the client) may still be considered unsolicited if it received at the application server after a path through the firewall has closed.

In optional operation 304, the application server attempts to send the unsolicited communication directly to the client, using the client address (e.g., IP address, UDP port number) it last knew of for the client. The attempt to send the communication is made using the application server's address as the originating address.

In optional operation 306, the application server determines whether the attempt to send the communication in operation 304 was successful. For example, a communication address the application server has for the client may still be valid. And, if the client is shielded by a firewall, a communication path may be open for the application server if the client recently sent a communication to the server. If the attempt to send the unsolicited communication to the client succeeds, the illustrated method may end; otherwise, the method continues with operation 308.

In operation 308, the application server retrieves the client's address from a connectionless server. The connectionless server, as described above, may store addresses and/or other information relating to clients from which or for which the connectionless server receives heartbeat messages. The application server may query multiple connectionless servers, with the client's unique identifier or other information, and receive a response from a connectionless server currently receiving heartbeat messages from the client.

The application server may also receive (or already know) the connectionless server's communication address, how recently the last heartbeat message was received from the client, etc.

In operation 310, the application server spoofs the connectionless server by formatting and sending the unsolicited communication to make it appear to have originated from the connectionless server. The communication can therefore transit a firewall path opened as a result of the client's issuance of heartbeat messages to the connectionless server.

In this embodiment of the invention, the communication sent to the client identifies the application server so that the client can respond directly to that server. Thus, multiple application servers may be interacting with the client during one client session. For example, different application servers may be handling instant messaging streams between the client and other clients, different VOIP sessions, etc.

When the application server has an unsolicited communication for a persistent-only client, it may query the connectionless server for an address to which to send the communication, and may receive a client manager's address in return. The communication is sent to the client manager, via a persistent or non-persistent connection, and the client manager converts the communication as necessary (e.g., from UDP format into TCP format) and forwards it to the persistent-only client.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of conducting client-server communications using a non-persistent communication protocol, the method comprising:

receiving at a first server periodic heartbeat communications from a first client, via non-persistent communication connections;

storing at the first server a communication address associated with the first client; and at a second server, when the second server possesses an unsolicited message for the first client:

retrieving the communication address;

configuring the transmission to comprise an origination address corresponding to the first server; and transmitting the unsolicited message to the first client from the second server via a first non-persistent communication connection.

2. The method of claim 1, further comprising, prior to said receiving:

registering the first client at the second server; and
providing the first client a unique client identifier;
wherein each said periodic heartbeat communication identifies said unique client identifier.

3. The method of claim 1, wherein the non-persistent communication connections, including the first non-persistent communication connection, are UDP (User Datagram Protocol) connections.

4. The method of claim 1, further comprising: establishing a first persistent communication connection between a client manager and a second client unable to open a non-persistent communication connection with the first server; and
periodically issuing heartbeat communications identifying the second client, via non-persistent communication connections from the client manager to the first server;
wherein the heartbeat communications indicate a status of the second client.

5. The method of claim 4, further comprising, upon receipt at the second server of an unsolicited message for the second client:
transmitting the unsolicited message to the client manager via a non-persistent communication connection; and
forwarding the unsolicited message to the second client from the client manager via the first persistent communication connection.

6. The method of claim 1, wherein the first client is protected by an entity configured to block unsolicited communications from reaching the first client.

7. The method of claim 6, wherein the entity comprises at least one of:
a firewall;
a proxy; or
a network address translator.

8. The method of claim 1, wherein the second server is configured to serve an application in which the first client engages in communications with other clients.

9. The method of claim 8 wherein the application comprises one of:
instant messaging; or
VOIP (Voice Over Internet Protocol) telephony.

10. A computer readable medium storing instructions that, when executed by a computer, cause the computer to perform a method of conducting client-server communications using a non-persistent communication protocol, the method comprising:
receiving at a first server periodic heartbeat communications from a first client, via non-persistent communication connections;
storing at the first server a communication address associated with the first client; and
at a second server, when the second server possesses an unsolicited message for the first client:
retrieving the communication address;
configuring the transmission to comprise an origination address corresponding to the first server; and
transmitting the unsolicited message to the first client from the second server via a first non-persistent communication connection.

11. A client-server system employing non-persistent communication connections, the system comprising:
a connectionless server configured to:
receive periodic messages from clients via non-persistent communication connections; and
identify the clients' communication addresses to application servers;
a first application server configured to:
serve an application; and
transmit a first unsolicited communication to a first client, via a first non-persistent communication connection, by spoofing said connectionless server; and
a client manager configured to:
establish a persistent communication connection with a first persistent-only client incapable of engaging in non-persistent communication connections with said connectionless server; and
issue periodic messages to said connectionless server on behalf of the first persistent-only client wherein said periodic messages issued on behalf of the first persistent-only client report a status of the first persistent-only client.

12. The client-server system of claim 11, wherein said spoofing comprises configuring said transmission of the first unsolicited communication with an origination address corresponding to said connectionless server.

13. The client-server system of claim 11, wherein the first client is protected by an entity configured to block unsolicited communications from reaching the first client.

14. The client-server system of claim 13, wherein the entity comprises at least one of:
a firewall;
a proxy; or
a network address translator.

15. The client-server system of claim 11, wherein said client manager is further configured to:
receive an unsolicited communication addressed to the first persistent-only client, from an application server, via a non-persistent communication connection; and
forward the unsolicited communication to the first persistent-only client via a first persistent communication connection established between the client manager and the first persistent-only client.

16. The client-server system of claim 11, wherein one or more of the connectionless server and the first application server are configured to issue the first client a unique client identifier.

17. The client-server system of claim 11, wherein each said periodic message from a client comprises:
a unique client identifier assigned to the client; and
the client's communication address.

18. The client-server system of claim 11, wherein the non-persistent communication connections, including the first non-persistent communication connection, are UDP (User Datagram Protocol) communication connections.

19. The client-server system of claim 11, wherein the first application server is configured to serve an application in which the first client engages in communications with other clients.

20. The client-server system of claim 19, wherein the application comprises one of:
instant messaging; or
VOIP (Voice over Internet Protocol) telephony.

* * * * *

UNITED STATES PATENT AND TRADEMARK OFFICE
CERTIFICATE OF CORRECTION

| | | |
|---|---|---|
| PATENT NO. | : 7,617,525 B1 | Page 1 of 1 |
| APPLICATION NO. | : 11/157421 | |
| DATED | : January 13, 2004 | |
| INVENTOR(S) | : Andrew Moeck and Wendell Brown | |

It is certified that error appears in the above-identified patent and that said Letters Patent is hereby corrected as shown below:

*In claim 4, replace lines 9-12 of column 11 with:*
4. The method of claim 1, further comprising:
establishing a first persistent communication connection
   between a client manager and a second client unable to
   open a non-persistent communication connection with
   the first server; and

*In claim 9 (column 11, line 37), replace* "claim 8" *with* --claim 8,--

*In claim 10, replace lines 46-58 of column 11 with*:
receiving at a first server periodic heartbeat communications
   from a first client, via non-persistent communications
   connections;
storing at the first server a communication address associated
   with the first client; and
at a second server, when the second server possesses
   an unsolicited message for the first client:
   retrieving the communication address;
   configuring the transmission to comprise an origination
     address corresponding to the first server; and
   transmitting the unsolicited message to the first client
     from the second server via a first non-persistent communication
     connection.

*In claim 11 (column 12, line 16), replace* "client" *with* --client,--.

Signed and Sealed this

Twenty-ninth Day of December, 2009

David J. Kappos
*Director of the United States Patent and Trademark Office*